(No Model.) 2 Sheets—Sheet 2.

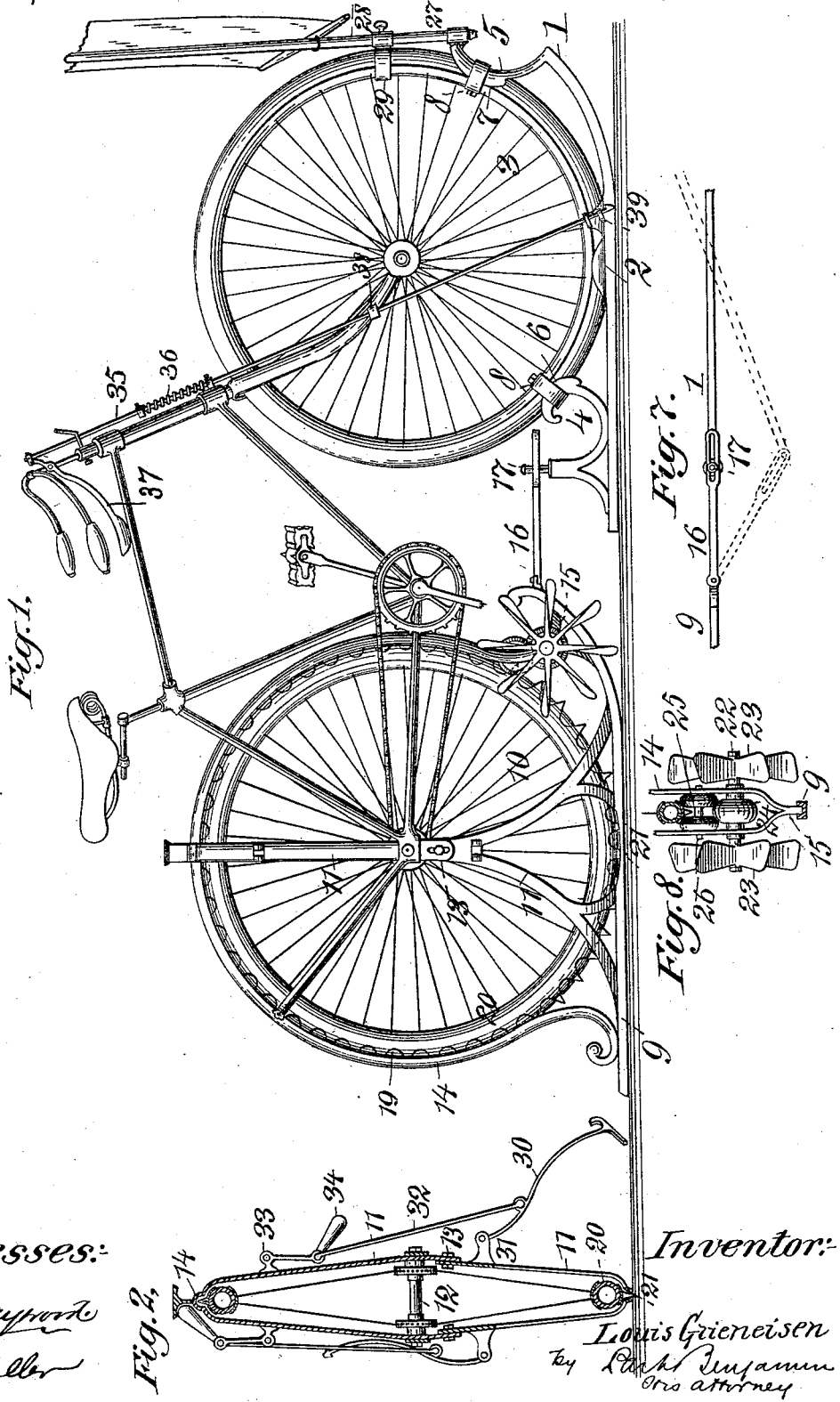

L. GRIENEISEN.
ICE VELOCIPEDE.

No. 521,496. Patented June 19, 1894.

Witnesses:-
D. H. Maynard
H. P. Moller

Inventor:-
Louis Grieneisen
by Park Benjamin
his Attorney

UNITED STATES PATENT OFFICE.

LOUIS GRIENEISEN, OF PHILADELPHIA, PENNSYLVANIA.

ICE-VELOCIPEDE.

SPECIFICATION forming part of Letters Patent No. 521,496, dated June 19, 1894.

Application filed December 5, 1893. Serial No. 492,829. (No model.)

*To all whom it may concern:*

Be it known that I, LOUIS GRIENEISEN, of the city of Philadelphia, State of Pennsylvania, have invented a new and useful Improvement in Ice-Carriages, of which the following is a specification.

My invention as it is herein illustrated embodies the following principal features.

First: A structure to which an ordinary bicycle may be applied to adapt it to ice uses or as an ice carriage. This consists of two runners to one of which the front or steering wheel of the bicycle is rigidly fastened. The second runner, immediately in rear of the first, supports the rear wheel of the bicycle, which may be turned by the ordinary treadles. The two runners are so linked together that the front runner may be manipulated to steer the machine, by the usual bicycle steering arms.

Second: A novel protecting metal tire and the mode of propelling the apparatus. The rear wheel supported by its axle in standards from the rear runner has an inner tire of soft material and a protecting external tire of metal. The construction of said external tire and its mode of application is an important feature of my invention. To adapt it to the specific purpose here in view it is provided with projecting points which extending down through an opening in the rear runner engage with the ice. In this way the rear wheel is revolved by the treadles in the usual manner and the machine is thus propelled.

Third: A mechanism especially constructed to drive the machine through snow. This consists in swiftly moving small propelling wheels actuated from the bicycle driving wheel.

Fourth: Mechanism adapting the machine to be sailed on the ice. Means are provided for holding a mast and sail together with outriggers for supporting the machine laterally.

Fifth: A brake mechanism.

Sixth: Means for varying the extent of projection of the points on the driving wheel, or for withdrawing them from operation.

Figure 4:
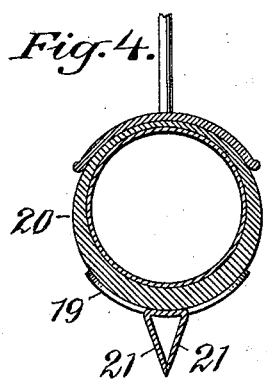
Figure 3:
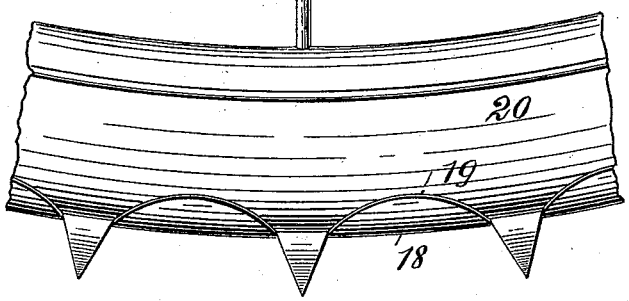
Figure 5:
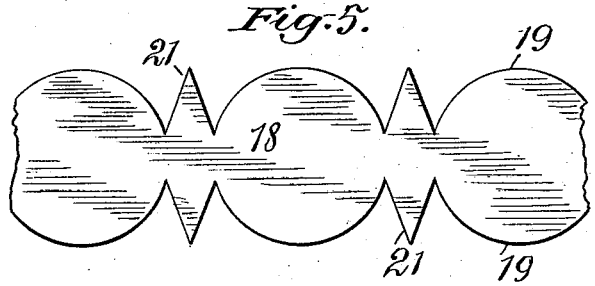
Figure 6:
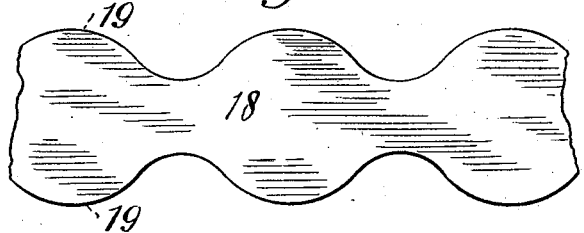

In the accompanying drawings Figure 1, is a side elevation and Fig. 2, is a vertical section through the rear wheel. Fig. 3, is a side view and Fig. 4, a transverse section of the wheel rim and pneumatic tire showing the external metal tire in place. Fig. 5, shows a portion of the metal tire flattened to exhibit the conformation. Fig. 6, shows the same, but without the projecting points whereby the tire engages with the ice. Fig. 7, is a plan of the link connection between the front and rear runner; and Fig. 8, is a detail view of the appliance for propelling the bicycle through snow, and for removing snow from in front of the driving wheel.

Similar letters of reference indicate like parts.

My device as herein illustrated may be applied to any known form of bicycle. The construction of the bicycle here shown therefore forms no part of my invention, and as it is well understood at the present time detailed description thereof is unnecessary.

1 is a single runner provided with jaws or recesses, 2, in which the rim of the front or steering wheel 3 is received. Upon said runner are suitable supports as 4 and 5 which carry additional jaws 6 and 7 also for the reception of the wheel rim. Straps 8 which may be of metal and detachably bolted to the inner side of the wheel rim pass around said rim and the jaws 6 and 7: and in this way said wheel 3 is immovably held and firmly secured to the runner 1.

9 is a runner which is disposed below the rear or driving wheel 10. It is provided with standards which extend upward on each side of said wheel and arch over the top thereof. The wheel axle 12 is journaled in said standards. Said standards are also made in parts so as to be adjustable; that is to say the upper portion thereof extends for a short distance downward below each axle journal and has a longitudinal slot as shown at 13. The parts which rise up from the runner 9 are connected to said depending portions by bolts passing through said slots 13. By suitably changing the position of said bolts the height of the wheel axle above the runner 9 may be adjusted as desired.

Secured near the rear end of the runner 9 and passing over the wheel is the curved guard 14. The forward extremity of said guard is forked as shown in Fig. 8, (to receive the mechanism there represented and hereinafter to be explained) and is likewise secured by short standards 15 to the runner 9.

Pivoted to the front of the rear runner 9 is a link bar 16. The opposite extremity of said bar has an elongated slot which receives the pin 17 which is supported upon the front runner 1, in rear of the front wheel 3, Fig. 7.

From the foregoing description it will be seen that I have applied runners to the ordinary bicycle—that the front or steering wheel is immovably supported in its runner—and that the rear or driving wheel is supported by its axle upon the standards of the rear runner. It will also be seen that the two runners are connected by a link, so that when the front wheel is turned by the ordinary steering arms the front runner will move with it—being permitted to do so by the link 16—consequently it will be understood that the bicycle when my device is applied to it is to be steered in the usual and ordinary way.

I will now describe my new external metal tire—which I have embodied as a part of the structure here illustrated. It is a well known defect of the soft tire made of rubber, canvas or like material, that it is apt to become worn through in time, and also to be cut in passing over sharp projections, &c. To protect such a tire by an external inclosing tire of metal has so far as I now know been found impracticable: because both the mode of attachment of the tire and its own stiffness have tended to neutralize the advantages gained by the yielding rubber or air tire. I make my metal tire 18 of a thin band of elastic steel, which is easily bent around the rubber or air tire, and the ends of which are secured by rivets or in any other suitable way. This band I form preferably as shown in Fig. 6, that is with lateral projections 19. These projections are turned inwardly as shown in Figs. 3 and 4 so that they receive and grasp the periphery of the soft tire 20. If a solid rubber tire be used then the metal tire 18 must be strained around it sufficiently tight to be held thereon in the manner described. If an air or pneumatic tire be employed the metal tire is simply put in position before the air tire is inflated. It will be apparent that by this construction the tire is held in place without the use of any mechanical contrivance attaching it to the wheel proper, and simply by its own elasticity and that of the yielding tire which it incloses. It may therefore be made of very elastic steel and hence will not act to impair the resilience of the rubber or air tire while it completely protects the outer periphery thereof from damage. It also is very easily applied or removed.

In constructing this tire for ice use I prefer to shape it as shown in Fig 5, that is with pointed projections 21 alternating with the rounded projections 19. These points 21 are turned downward and brought together as shown in Fig. 4, so that they project outwardly from the rear wheel—and through a slot formed in the body of the rear runner 9. Consequently when the driving wheel of the bicycle is rotated by the treadles in the usual way, the points 21 which project slightly below the runner 9 engage with the ice, and in that way the machine is propelled.

The advantage of providing the adjusting device hereinbefore described for altering the height of the wheel axle above the runner therefore is that by that means either the amount which the points 21 project below the runner can be regulated—or the points may be lifted entirely above the lower runner surface and thus prevented from engaging with the ice at all, the object of doing which last is hereinafter explained.

I have thus described a device which may be combined with an ordinary bicycle, and by means of which the said bicycle becomes an ice carriage (substantially a skate), and yet is steered and driven by the same mechanism and in substantially the same way, as when running directly upon its wheels.

I will now explain two attachments which are herein also embodied. In order more effectually to drive the machine through snow, I provide an additional propelling device which is represented separately in Fig. 8. Through the forked front end of the guard 14 passes a shaft 22 which carries two propelling wheels 23. The blades of these wheels are given pitch so that when the wheels are rotated they will not only tend to drive the machine ahead by their engagement with the snow, but will also act to throw the snow outwardly and hence from in front of the main driving wheel. Even where the wheels 23 do not exercise the principal propelling effect—as where the machine is running on ice and passes through drifts of loose snow—the conformation of the blades above noted serves to throw the snow from in front of the engaging points and thus facilitate their hold on the ice. The shaft 22 carries a friction disk 24 which engages with two similar disks 25 on a short shaft 26 also journaled in the guard 14. The periphery of the driving wheel bears upon the disks 25, which are separated sufficiently to allow the projecting points 21 to pass between them. The disks 24, 25 may be of rubber, and their relation in point of size to the driving wheel, causes them to be driven at a high rate of speed: so that the comparatively small wheels 23 will by reason of their velocity exercise a powerful propelling effect.

The second attachment before noted adapts the machine to use as an ice boat. On the front end of the front runner 1 is provided a socket 27 in which is stepped a mast 28 for supporting the sail—here merely indicated—but which is of course to be of proper form and dimensions and provided with suitable rigging for handling it. The mast 28 is further supported by the clamping ring 29 which engages with the wheel rim.

In order to prevent the machine from being blown over I provide on each side an outrigger 30 which is simply an arm pivoted at 31 to the lower part of standard 11. A jointed lever 32 is secured to the outrigger 30 and to a bracket 33 on the upper part of standard 11, and is provided with a handle 34. By pushing down the handle 32 as shown on the right of Fig. 2 the outrigger 28 is thrown outward—and by lifting the handle as represented on the left of Fig. 2 the outrigger is raised. These handles are easily manipulated by the person in the saddle.

In arranging the machine for sailing the standards 11 are adjusted so that the points 21 no longer engage with the ice, the mast and sail are put in place, and the outrigger 28 on the lee side is thrown outward to bear upon the ice—or if a still wider bearing surface is desired both outriggers may be extended.

In order to check the motion of the machine or stop it I employ the usual brake rod 35 provided with a lifting coiled spring 36, and a lever 37 in proximity to the steering handles: but instead of terminating this rod with a brake plate as is usual I carry it down through a guide 38 on the front wheel fork and 39 on the runner 1 and end it in a point which when the lever 37 is raised becomes fixed into the ice.

I claim—

1. In an ice carriage two runners placed one in advance of the other, a propelling wheel supported on one of said runners, a means of rotating said wheel and thereby propelling said carriage by the contact of the wheel periphery with the surface whereon the runners rest, a link connection between said runners, and means for moving the other of said runners to place the same at an angle to the runner supporting the driving wheel.

2. In combination with a bicycle having its wheels each supported on a single runner, a pivoted outrigger as 30 and lever mechanism for operating said outrigger.

3. In combination with a bicycle having its wheels each supported on a single runner, a mast and sail supported on one of said runners, a pivoted outrigger as 30 and lever mechanism for operating said outrigger.

4. In combination with a bicycle the runner 1 and means for clamping the front wheel 3 of said bicycle to said runner, the runner 9 having standards 11 and bearings in said standards for the axle of the lead wheel 10 of said bicycle, guard 14 around said wheel 10, shaft 22 carrying blade wheels 23 journaled in said guard 14 and said shaft 22 being rotated from said wheel 10.

LOUIS GRIENEISEN.

Witnesses:
JOHN H. CRAVEN,
LYNNE K. LEWIS.